United States Patent Office 3,697,224
Patented Oct. 10, 1972

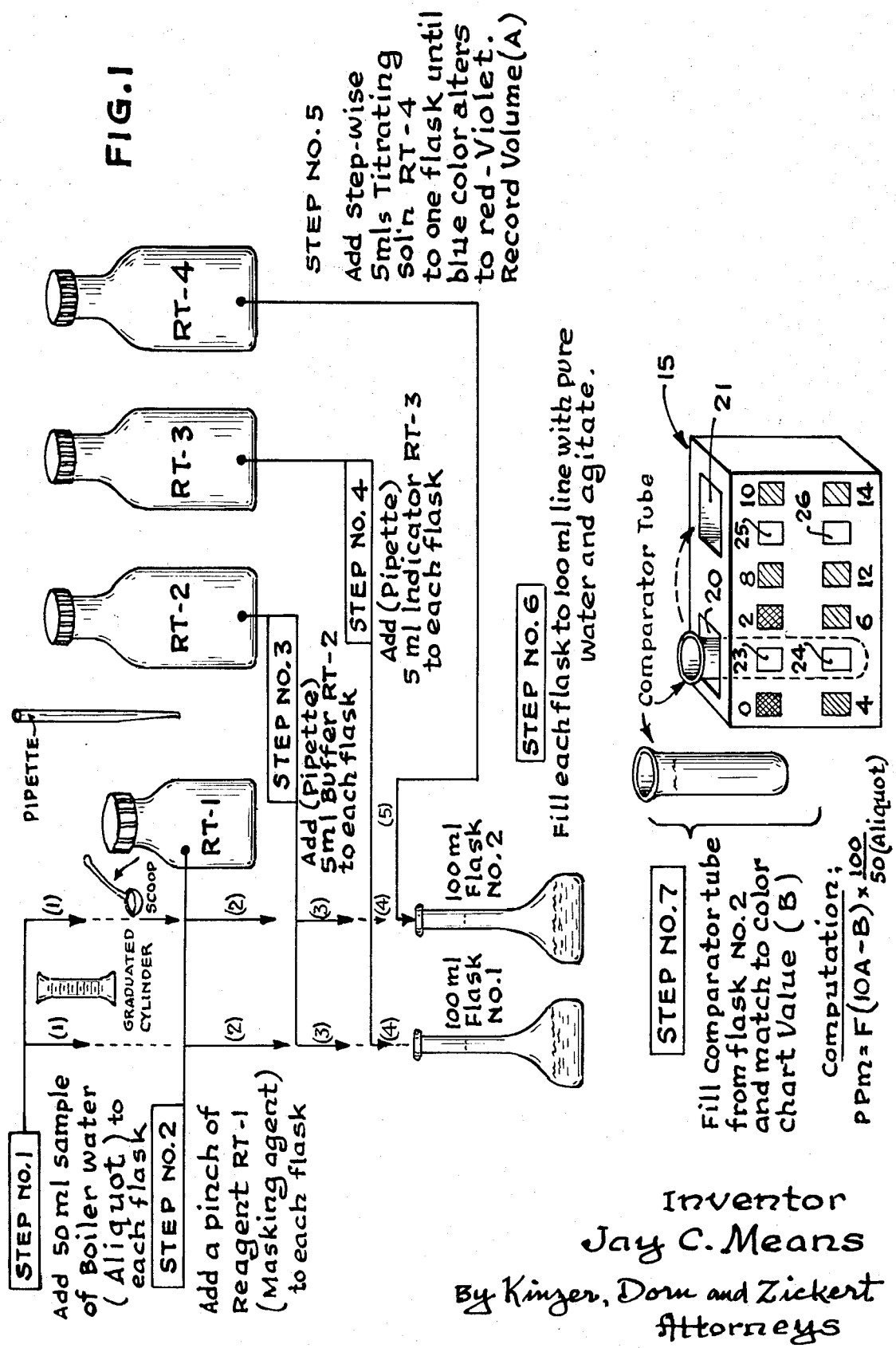

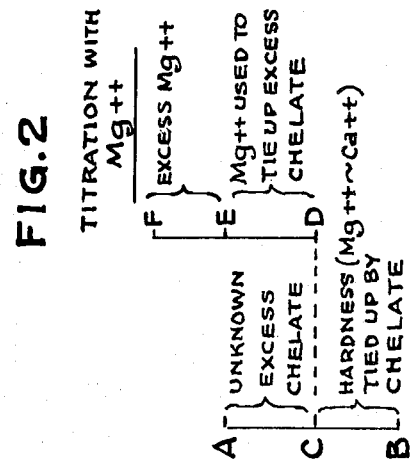
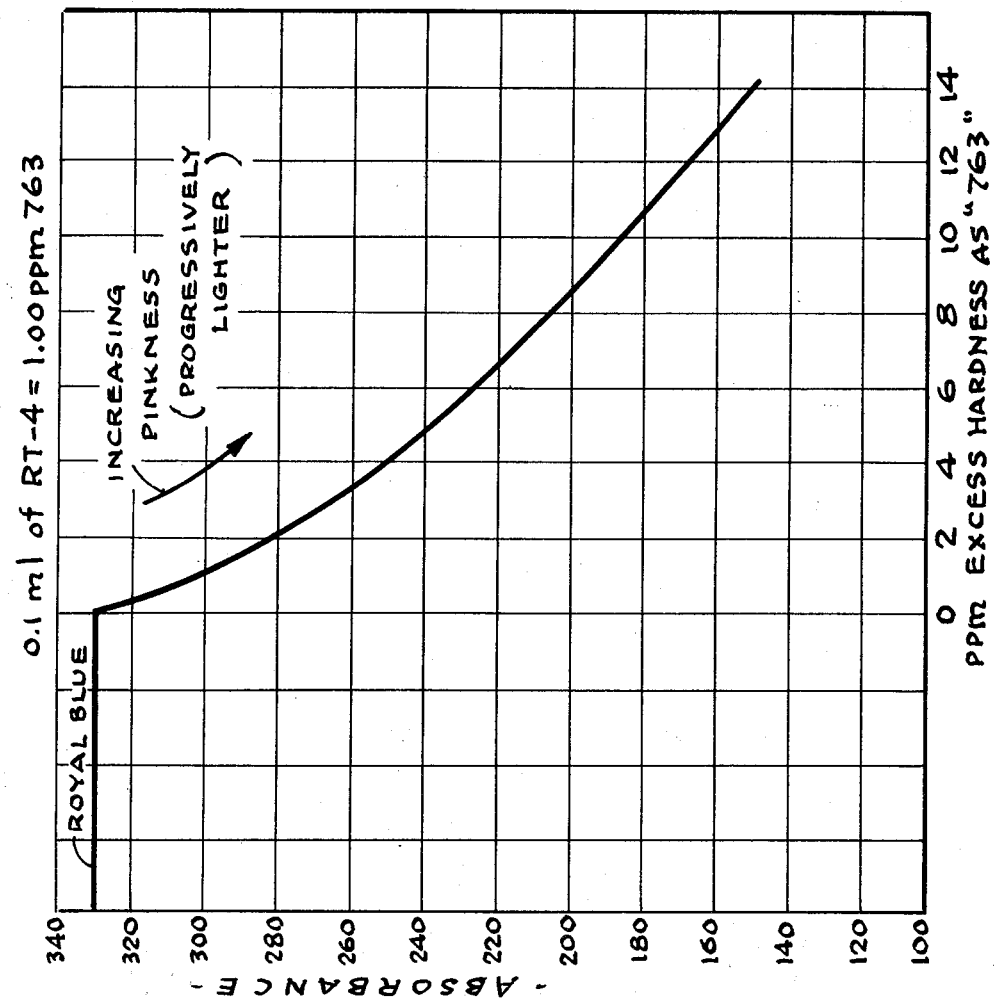

3,697,224
TITRATION OF EXCESS CHELATING AGENT
Jay C. Means, River Forest, Ill., assignor to
Nalco Chemical Company, Chicago, Ill.
Filed Oct. 30, 1970, Ser. No. 85,676
Int. Cl. G01n 21/24, 31/22, 33/18
U.S. Cl. 23—230 R                  3 Claims

ABSTRACT OF THE DISCLOSURE

The amount of excess chelating agent used to counteract water hardness is determined by spectrophotometric means using Calcon as an indicator. The spectrophotometric means may be of laboratory scale or may be an empirical part of a field kit.

---

This invention relates to the determination of the content of certain chelating agents (chelant) in boiler water, the chelant having been added for the purpose of sequestering calcium and magnesium which are notorious scale-formers.

Nitrilotriacetic acid (NTA) and styrene-maleic acid (SMA) are used as chelating agents in various proportions as boiler water treatment to prevent precipitation and scaling of calcium and magnesium. The agent tenaciously holds or sequesters the metal ions ($Mg^{++}$ or $Ca^{++}$) and prevents the metal from depositing as a scale. Optimum effectiveness is achieved when there is an excess of the chelating agent present in the boiler feed water and in the boiler, controlled within specific limits, say 10 to 20% excess.

The excess or residual amount of chelating agent may be determined by titration, that is, the unknown amount, as in any other titration, is determined by adding a reagent with which the unknown amount will react in definite and known proportions. Knowing the amount of reagent used to reach the end point, it becomes a matter of calculation to determine the unknown quantity. Reaction is complete at the so-called "end point," usually manifest in some visibly detected change, such as a change in color. Thus, the only purpose of the indicator is to signal, by color change, that reaction is complete, the titrant having "balanced" the unknown quantity in a manner of speaking.

A titration procedure for determining excess chelating agent in boiler water is known, but it has also been recognized for some time that unacceptable inaccuracies were being encountered when titrating weak agents such as SMA. For example, one drop of the titrant previously used, a magnesium solution, is equivalent to 2.5 p.p.m. (parts per million) of NTA and is equivalent to 10 p.p.m. of a 16:50 mixture of NTA and SMA when used in the presence of Xylidyl Blue II as an indicator, and even then an indistinct or dragging end point is encountered when other metals are present.

The object of the present invention is to develop a more reliable and accurate test for residual or uncombined (excess) chelant and one which is of sufficient simplicity as to be readily adapted to field use by unskilled workers, sensitive to 1 p.p.m. in spite of heavy metal interferences such as from iron and copper.

Other objects of the present invention are to develop a titration procedure for excess chelant using an indicator which will exhibit substantially the same color change for both $Mg^{++}$ and $Ca^{++}$ ions, which displays stability in dilute aqueous solutions, which exhibits a linear color change with increased hardness concentrations when determined spectrophotometrically (absorbance vs. concentration), which does not exhibit a color change with variable chelant concentrations, which does not display competition with the chelant for the metal ions which would cause a premature end point, which forms as few interfering complexes as possible, and which does not compete strenuously with masking agents for heavy metal ions. The present invention in fact meets the objectives and makes possible the accurate determination of a wide range of residual concentrations of chelating agent by means of a titration folowed by colorimetric end point determination. In the drawing:

FIG. 1 is a schematic depiction of one procedure characterizing the present invention;

FIG. 2 is a diagram showing empirical relations here involved; and

FIG. 3 is a graph pertaining to the spectrophotometry here involved.

The ideal indicator only changes color and does not interfere with the reactions which produce the end point. A careful preliminary investigation established that Xylidyl Blue II, as an indicator, indeed competes to successfully for $Mg^{++}$ ions, even in the presence of an excess of the chelant as was suspected. This indicator was therefore deemed unacceptable.

A literature search suggested "Calcon," [1-(2-hydroxy-1-naphthyl-azo)-2-napthol-4-sulfonic acid-Na salt] as an indicator. Afterwards, my work established that Calcon as an indicator (1) gave substantially the same color absorbance values when the concentration of chelating agent (NTA:SMA=75:25) ranged from 1 p.p.m. to 500 p.p.m.; (2) exhibited a nearly linear relationship between color absorbance values and hardness concentration; and (3) gave the same color absorbance in the presence of pure water as when there was an excess of the chelant over hardness. This means (1) that the color of Calcon as an indicator does not vary appreciably when added to either a large (or small) concentration of the chelate; (2) the indicator Calcon will not appreciably change color as the end point of titration is approached; and (3) the indicator does not compete with the chelating agent for the metal ions, unlike the Xylidyl Blue II indicator which does compete and which displays a fuzzy, unacceptable end point.

Any titration procedure requires a determination of "equivalence." Thus, the point of titration where the amount of titrant added is just sufficient to combine in a stoichiometric relation with the unknown amount of chelant is referred to as the equivalence point. When one considers the effect of the indicator, it may be further stated that the experimentally observed signal for termination of titration (viz, change in color of the indicator) is referred to as the "end point" which should be very close to the "equivalence point." The ideal situation may be stated thus:

End Point=Equivalence Point=Change of Color of Indicator=Amount of titrant balances (combines exactly with) the unknown amount of chelate.

The equivalence point varies with the type of compound being titrated. Thus, the equivalence value of $$MgCl_2.6H_2O$$

which is the titrant herein, is different for NTA per se than for SMA per se, and is different for any mixture of the two. The equivalence value is designated F in the formula hereinafter given.

Equivalence with hardness is determined by the point-comparison method, checking the absorbance (spectrophotometric) points generated by a standard series (0.00, 0.10 . . . 1.40 ml. $MgCl_2$ titrant) with the points generated by a sample containing a known concentration of the chelant and excess hardness equivalent to the standard series, the aim being to develop a titrant 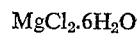containing the equivalent of 1 p.p.m. chelate per 0.1 ml. When the points coincide, the equivalence is established.

With regard to the determination of equivalence it is to be constantly borne in mind that in the present instance one really titrates for excess of the chelating agent, since an excess of the agent characterizes efficiency as noted above.

Attention is directed to FIG. 2. Line $\overline{AB}$ represents the total amount of chelating agent added to the boiler water. The amount of chelant, $\overline{CB}$, is the portion of $\overline{AB}$ required to tie up the water hardness (Mg++ or Ca++ or both) meaning that $\overline{AC}$ is the unknown excess or residual chelant to be determined by titration under the present invention.

$\overline{DF}$ is the total titrant added. $\overline{DE}$ is the amount of titrant equivalent to the residual chelant $\overline{AC}$, and $\overline{EF}$ as an amount is determined spectrophotometrically and by difference ($\overline{DF}-\overline{EF}=\overline{DE}$) one determines how much of the titrant $\overline{DF}$ was required to "balance" the residual chelant, $\overline{AC}$. Then, by computations, one determines the excess or residual chelant, $\overline{AC}$.

It is to be further explained that the titrant,

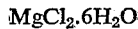

itself represents water hardness (Mg++) so that when added to a boiler water sample containing a suspected excess of the chelant, one could add $MgCl_2$ until the end point is attained where the added Mg++ ions (titrant) are bound up exactly by the excess chelant.

As noted above, equivalence of a chelant with hardness is determined by checking the absorbance points generated by a standard series of titrant (0.00 . . . 1.40 ml). with points generated by samples containing a known concentration of chelant and excess hardness (excess Mg++ over the chelant) equivalent to the standard series. Magnesium chloride in water is colorless; the indicator Calcon by itself in water gives a blue color with an absorbance value of 0.330 (pH 10, buffered with $$NH_4OH:NH_4Cl)$$

Thus, samples (first sample) containing known concentrations of $MgCl_2$ (Calcon indicator and buffer also present) were observed for absorbance values.

Additional (second) samples having a known concentration of the chelant were then prepared and

of a concentration suspected of being near to 0.1 ml. titrant equal to 1 p.p.m. chelate was added. If true, then 0.7 ml. of titrant should allow an excess of 1 p.p.m. hardness (unbalanced by the added titrant) in a sample (second) containing a known chelant concentration of 6 p.p.m., and the excess hardness (1 p.p.m.) should then produce an absorbance value equal to the first sample having a known excess of 1 p.p.m. (0.1 ml.) hardness. If the absorbance values do not match, then the concentration of $MgCl_2.6H_2O$ is adjusted until 0.1 ml. of the titrant does indeed represent 1 p.p.m. of the chelant. By so proceeding, I established that 1 p.p.m. chelant (75 NTA:25 SMA) is equivalent to 0.490 p.p.m. $MgCl_2.6H_2O$.

The reagents used or prepared in the equivalence study (all "reagent" grade), and others hereinafter referred to, are:

(1) RT-1, diethyldithiocarbamate-sodium salt

The salt is used as a masking agent directly as it comes from the manufacturer, and is intended to neutralize iron, copper and zinc.

(2) RT-2, buffer solution, pH=10

Dissolve 20.0 grams of $NH_4Cl$ in double deionized water. Add 220 ml. of concentrated $NH_4OH$, 100 ml. of triethanolamine, and 20 ml. of tetraethylene pentamine. Dilute to one liter with double deionized water.

(3) RT-3, indicator solution

Dissolve exactly 130.0 mg. of Calcon [1-(2-hydroxy-1-naphthyl-azo-) 2-naphthol-4-sulfonate-Na salt] in one liter of reagent methanol. Stir well.

(4) RT-4, magnesium chloride titrating solution

Dissolve 490 mg. of $MgCl_2.6H_2O$ in one liter of double deionized water. The titrating solution is standardized by atomic absorption. The titrant must give a concentration of 241 p.p.m. $MgCl_2$ as $CaCO_3$ ±2 p.p.m. If the original titrant does not fall into this range, it must be adjusted to correspond to this range.

The buffer RT-2 (5 ml.) is added to the samples (50 ml.) presented in 100 ml. flasks to which is then added 5 ml. of the Calcon indicator RT-3 (conc: 130 mg./l.). The titrant, RT-4, is varied in concentration to determine equivalence in terms of 0.1 ml. ≈1 p.p.m. chelant.

The equivalence as represented by a standard absorbance curve, FIG. 3, is verified as follows: Eleven flasks containing 0.00, 0.20, 0.40 . . . 2.0 ml. of RT-4 ($MgCl_2$ titrating solution) are prepared as representing 0.0, 2.0, 4.0 . . . 20.0 p.p.m. excess hardness as chelant (75 NTA; 25 SMA). Then, pipette 5 ml. of RT-2 into each flask and 5 ml. of the indicator RT-3; dilute to 100 ml. and agitate; record the absorbance of each solution at 640 mμ in a 1 cm. cell.

The absorbance values were plotted against p.p.m. excess hardness as chelant No. "763," FIG. 3, which is the 75 NTA: 25 SMA chelant mentioned above. After the preparation of the standard curve, FIG. 3, a series of synthetic samples were made up which contained known amounts of "763" and RT-4. The samples were titrated to an excess of hardness as indicated by the color change of Calcon from blue to reddish violet, diluted to the mark (100 ml.) mixed, and the absorbance recorded. The theoretical excesses were calculated from the formulation and the titration, and these values were compared with the excess values obtained from the absorbance data. In every case the values agreed within ±0.3 p.p.m. The average variation from the theoretical value was ±0.2 p.p.m. (Table I).

TABLE I

[Verification of the standard curve for residual chelant "763"]

| P.p.m. 763 | P.p.m. hardness as 763 | Residual, p.p.m. 763 | Titration, ml. | Residual, p.p.m. 763 found | Error, p.p.m. |
|---|---|---|---|---|---|
| 25.0 | 0.0 | 25.0 | 3.11 | 24.9 | −0.1 |
| 25.0 | 5.0 | 20.0 | 2.62 | 20.3 | +0.3 |
| 25.0 | 10.0 | 15.0 | 1.84 | 14.8 | −0.2 |
| 25.0 | 15.0 | 10.0 | 1.35 | 10.2 | +0.2 |
| 25.0 | 20.0 | 5.0 | 1.26 | 4.8 | −0.2 |

Of course the same procedure is followed for determining equivalence for any other chelating agent. A statistical study established that for an experienced operator the error is ±0.2 p.p.m., for a trainee, the error is ±0.4 p.p.m.

Spectrophotometric titration procedure (laboratory)

(1) In duplicate, measure accurately 50.0 ml. of clear supernatant sample or filtrate in a graduated cylinder, and transfer to a 100 ml. volumetric flask. Moderate turbidity can be tolerated; if in doubt, filter.

(2) Add 50 mgs. of RT-1 powder to each flask.

(3) Pipette into each flask 5.00 ml. of the RT-2 reagent using a 5 ml. serological pipette.

(4) Pipette volumetrically 5.00 ml. of RT-3 reagent into each flask.

(5) Titrate one flask from the pair with RT-4 using a microburette or a 2 ml. pipette (graduated in 0.01 ml. units) until the indicator turns from blue to a deep violet color. Record the volume of titrant used to the nearest 0.01 ml.

(6) Dilute both flasks to the mark and mix thoroughly.

(7) Record to three decimal places (e.g. 0.315) the absorbance of both solutions in one centimeter cells at 640 mμ on a spectrophotometer. The untitrated solution is the *sample blank* and the titrated solution is the *sample*. The absorbances are read against a deionized water blank.

CALCULATIONS

The test has been constructed such that the actual analysis steps can remain consistent for different chelate products. The calculations also retain the same basic operations but involve the use of different curves and mathematical factors.

The calculations are based on three assumptions. First, that the Beer-Lambert Law governing the linear relationship of absorbance to concentration holds for the standard curves prepared for this test. Second, that the indicator will, in the absence of any interferences or hardness, give an absorbance of .330. Third, that the absorbance of the sample blank and sample are identical before titration. If these three assumptions hold, and they do, then it is possible to add and subtract absorbances. This makes it possible to correct for small variations from the expected sample blank value (.330) caused by turbidity, color, excess interferences, and reagent variation without preparing new standard curves for each analysis. The errors introduced into the analysis by this correction process are small and were included in the statistical study mentioned above. The individual steps in the calculation are outlined below.

The data from each analysis consists of two absorbance readings and the volume of the titration. The calculations include the following steps:

Hypothetical Data—Sample Blank . .310 (untitrated absorbance value).
(Chelant 763) Sample _____ .221 (titrated absorbance value).
Titration _____ 1.00 ml.

(1) "Normalize" the absorbance data to the curve, FIG. 3, to obviate or neutralize any unknown color factor:

```
           Example
    .330        .221
   -.310  ↗   +.020
   +.020 ╱    .241
```

(2) Read the normalized sample absorbance data from the curve and record the p.p.m. excess hardness as the chelating agent.

Ex. .241 on the 763 curve=5.0 p.p.m. excess hardness as "763."

(3) Multiply the titration value by the appropriate factor to determine hardness added. For "763" this factor is 10.00 because each ml. of titration represents 10 p.p.m. chelate.

Ex. 1.00×10.0=10.0 p.p.m. hardness as 763 added.

(4) Subtract the excess hardness (step 2) from the total hardness (step 3) to determine residual chelant.

Ex. 10.0−5.0=5.0 p.p.m. 763 residual.

(5) Multiply the residual value by the dilution factor.

Ex. 50 ml. aliquot or sample=dilution factor of 100/50=2
5.0 p.p.m.×2=10.0 p.p.m. 763 residual

Field titration, FIG. 1

Titration for excess chelate is, in practical terms, of more importance at the site of the boiler than in a laboratory equipped with spectrophotometric instrumentation. The present invention may be practiced by a technician furnished with a kit containing, FIG. 1, a pipette, a scoop, two 100 ml. flasks, bottles containing the reagents RT-1 . . . RT-4, a color comparator box 15 and two comparator tubes.

It should first be noted that the comparator box 15 is provided with two cells 20 and 21 for receiving the comparator tube. Cell 20 has two windows 23 and 24, and cell 21 has two windows 25 and 26 through which the contents of the tube are visible when the tube is set in the cell.

Opposite each window are panels numbered 0 . . . 14 as shown, and each panel 2 . . . 14 displays a color identical to that represented by the absorbance values, FIG. 3, for 2 . . . 14 p.p.m. excess chelate. The zero (0) panel on the comparator box 15 is royal blue, corresponding to any untitrated sample (e.g. flask No. 1, hereinafter). Panel 2 is the bluest and panel 14 is the reddest hue of violet.

The absorbance values in FIG. 3 are really a progression of color change to more distinct tints of red-violet as more and more of the standard titrant, $MgCl_2$, is added to the sample beyond the amount to exactly balance the excess chelate, recalling that 0.1 ml. of titrant at the concentration is equivalent to 1 p.p.m. chelant. Thus, if the sample after dilution contains 40 p.p.m., free (excess) chelant, only 4 ml. of the titrant is required to reach the end point. If 5 ml. of titrant are added then one has added 1 ml. of titrant beyond the end point. This excess of 1 ml. (equivalent to 10 p.p.m. "763" chelate) would correspond to an absorbance value of 0.187, FIG. 3, and panel No. 10 on the comparator box is colored accordingly.

This approach to titration was evaluated by trying it with eight persons who were only asked to match known samples to the color panels in the comparator box; the average standard deviation was only ±0.87 p.p.m.

Field procedure

The formula for computation is given in FIG. 1 and the factors will be apparent from the description to follow.

Each of the two flasks is filled with a 50 ml. aliquot of the boiler water to be tested. A small portion (50 mg.) of the masking agent, RT-1, is added to each flask. If high turbidity is encountered, the 50 ml. aliquot should be filtered and the filtrant returned to the flask as the aliquot.

5 ml. of the buffer, RT-2, is then added to each flask containing the aliquot, followed by the addition of 5 ml. of the indicator, RT-3. The color of the contents in each flask will be royal blue regardless of how much excess of chelate is present. At this stage, each flask contains an excess (unknown) amount AC, FIG. 2, of the chelating agent "763."

Next, the titrant ($MgCl_2$) (RT-4) is added in precise 0.5 ml. increments to *one* flask only (flask No. 2) until the blue color changes to red-violet. One disregards any effort to find an end point because we are adding $MgCl_2$ indiscriminately, but in a precisely known amount represented by line $\overline{DF}$, FIG. 2, including the unknown quantity $\overline{DE}$ required to balance the excess chelant. The volume of titrant added $\overline{DF}$ is recorded as value "A," say $A=1.0$. It should be stressed that an excess of the titrant will have been added, that is, an excess over the amount $\overline{DE}$ required to balance the excess chelant $\overline{CA}$; and again, we are interested in knowing exactly what the excess chelant is or was.

Next, each flask is filled with distilled water to the 100 ml. line and agitated. The color comparator tube is filled from flask No. 1 and is matched to one of the color panels on the box 15 which in nearly all instances will be zero.

The reason for thus comparing the contents of flask No. 1 is that some boiler waters have a yellowish tinge which tends to drive the royal blue color (Step No. 4, FIG. 1) in the direction of pink and hence it becomes necessary to correct for (normalize) this possible effect.

Next, the tube is emptied and filled from flask No. 2, and again the tube is compared to the color panels on box 15 until a match is made, say with panel No. 10. This first reading (flask No. 1) is subtracted from the second (flask No. 2) to obtain the "B" value. Thus, in the formula, FIG. 1, $B=10-0=10$. If, because of tinting, the first reading had been, say 2, then the value of B would be: $B=10-2=8$. In any event, the computation for "B" (using the value of 10 above) tells us what $\overline{EF}$ is.

The value of F in the formula, FIG. 1 is 1.0 because 0.1 ml. $MgCl_2$ titrant is equivalent to 1.0 p.p.m. excess "763" chelant; the value of A in the formula is multiplied by 10 because there are ten 0.1 ml. increments in 1 ml. The value of F (10A–B) is multiplied by the dilution factor 100/50, since 50 ml. of aliquot were diluted by 50 ml. of pure water.

It will be seen from the foregoing that I determine excess chelant (AC) in an aliquot of hard water, using Calcon as an indicator and a measured amount of $MgCl_2$ as the titrant, the amount of titrant being (EF) in excess of that required to tie up the excess chelant. The excess titrant (excess hardness) produces a characteristic alteration in the color of the indicator, beyond the end point, and the absorbance value, read spectrophotometrically from a sample of the titrated aliquot, identifies the excess EF as so many p.p.m. Knowing the total hardness added (titrant, $MgCl_2$) and the excess $(\overline{EF})$ one obtains by difference the amount of titrant $\overline{DE}$ required to neutralize the excess chelant, and by using a standardized titrant having a known equivalence to the chelant as herein determined, one can equate $\overline{DE}$ to $\overline{AC}$ in terms of p.p.m.

The field comparator presents a cell with a transparent opening through which may be viewed the color of the titrated aliquot sample and matched to one of several bordering panels varied as to color accordingly as the indicator is varied in color in proportion to a variant excess of the titrant, each panel having a value equated to p.p.m. excess titrant as the chelant.

While the preferred indicator is Calcon for the reasons specified, I recognize that a diligent search or study may reveal another chemical possessing equivalent attributes and which may therefore be used in place of Calcon. Therefore, it will be understood that modifications and variations may be effected without departing from the scope of the novel concepts of the present invention.

The invention is hereby claimed as follows:

1. A method of titrating an aliquot of hard water to determine any excess of chelating agent where AB is the total chelating agent present in the aliquot, BC is the amount of chelating agent used to tie up the hardness in the aliquot and AC is the unknown excess of chelating agent in the aliquot, comprising: adding to the aliquot, in the presence of an indicator, a measured amount DF of $MgCl_2$ as the titrant, the amount DF being purposely in excess of the lesser amount DE of $MgCl_2$ required to tie up AC as indicated by the characteristic alteration in the color of the indicator; determining spectrophotometrically from a sample of the aliquot containing the altered indicator, the amount EF by which the titrant exceeds DE; and equating DE to AC to determine the excess chelating agent.

2. A method according to claim 1, conducted with a field titration comparator kit having a cell for receiving a transparent tube containing the sample, said cell having a transparent opening through which may be viewed the color of the sample in the tube, said cell being bordered by panels which vary in color accordingly as the indicator is varied in color by an excess of the titrant, whereby the sample in the tube may be matched to a panel, and each panel having a value equated to p.p.m. excess titrant.

3. A method according to claim 1 in which the indicator is Calcon.

References Cited

UNITED STATES PATENTS

| | | | |
|---|---|---|---|
| 3,440,014 | 4/1969 | Robertson et al. | 23—230 R |
| 3,572,997 | 3/1971 | Burk | 23—253 TP |
| 2,583,890 | 1/1952 | Schwarzenbach | 23—230 R |
| 3,386,806 | 6/1968 | Kross | 23—230 R |

OTHER REFERENCES

Zamochnick, S. B. et al.: Analytical Abstracts, vol. 12, No. 688 (1965).

MORRIS O. WOLK, Primary Examiner

E. A. KATZ, Assistant Examiner

U.S. Cl. X.R.

23—253 R